Patented Jan. 15, 1929.

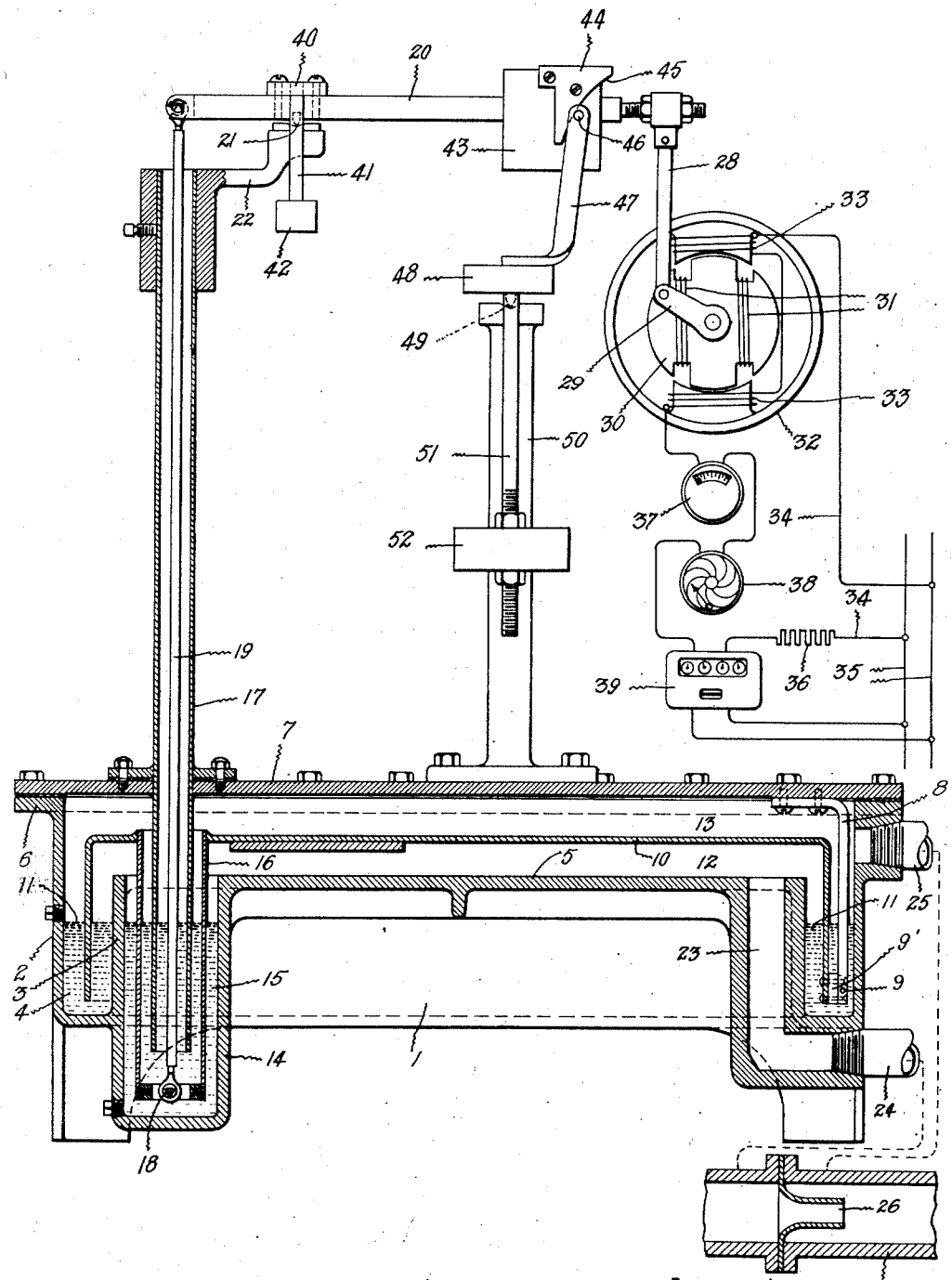

1,699,126

UNITED STATES PATENT OFFICE.

LOUIS W. THOMPSON, OF SCHENECTADY, NEW YORK, ASSIGNOR, BY MESNE ASSIGNMENTS, TO BAILEY METER COMPANY, A CORPORATION OF DELAWARE.

FLOW METER AND THE LIKE.

Application filed October 7, 1924. Serial No. 742,220.

The present invention relates to instruments wherein a movement is created which is proportional to a quantity to be measured and wherein such movement is used to effect a flow of electric current proportional to the movement whereby the flow of the electric current becomes a measure of the quantity to be measured. An application of my invention is in connection with flow meters for measuring the flow of fluids through conduits and it is this application which is illustrated in the drawing. It is to be understood, however, that this is only by way of example.

The object of my invention is to provide an improved instrument of this character, and for a consideration of what I believe to be novel and my invention, attention is directed to the accompanying description and the claims appended thereto.

In the drawing, the figure is a diagrammatic view, partly in section, of a flow meter embodying my invention.

Referring to the drawing, 1 indicates a base which may be rectangular or of other suitable shape, and which is provided with walls 2 and 3 which define a surrounding sealing chamber 4. The upper edges of walls 3 are formed integral with a bottom plate 5. Walls 2 project above walls 3 and are provided with flanges 6 to which is bolted a cover plate 7. Attached to the underside of cover plate 7 at one of its ends are two depending arms 8, one at each corner. At their lower ends arms 8 are provided with pintles 9 on which an inverted bell 10 is pivoted by means of hinge members 9'. The side walls of bell 10 are located in sealing chamber 4 and are sealed by means of a suitable liquid 11 such as mercury, contained in chamber 4. Bell 10 serves to divide the casing into two chambers, a leading pressure chamber 12 and a trailing pressure chamber 13.

At the end of base 1 opposite that at which bell 10 is hinged is a well 14 containing a sealing liquid 15 such as mercury. Depending into well 14 is a sleeve 16 which is attached at its upper end to bell 10 and communicates with trailing pressure chamber 13. Sleeve 16 is smaller in diameter than well 14 and terminates near the bottom of the well. Inside sleeve 16 and in spaced relation to it is a tube 17 which is attached to cover plate 7 and projects through it.

Attached to the lower end of sleeve 16 is a knife edge bearing 18 on which is hinged the lower end of a rod 19. Rod 19 projects out through tube 17 and at its upper end is hinged to one end of a lever 20 fulcrumed at 21 on a bracket arm 22 which is carried by the upper end of tube 17.

Communicating with leading pressure chamber 12 through a passage 23 is a leading pressure pipe 24 and communicating with trailing pressure chamber 13 is a trailing pressure pipe 25. Pipes 24 and 25 lead to the two sides of a suitable pressure difference creating device 26 located in a conduit 27 through which the fluid to be metered flows. By ways of example, a pressure difference creating device in the form of a flow tube is illustrated, the connections to it being indicated diagrammatically.

With the above described arrangement it will be seen that bell 10 is subjected on its inside to the leading pressure and on its outside to the trailing pressure and that these pressures are confined to their respective pressure chambers 12 and 13 by the sealing liquid 11 in chamber 4 and the sealing liquid 15 in well 14. The purpose of well 14 and the parts therein is to form a liquid seal through which rod 19 is connected to bell 10.

Connected to the end of lever 20 remote from rod 19 is a rod 28 which at its lower end is connected to an arm 29 fixed on an armature 30 so that when lever 20 moves the armature 30 is oscillated. On armature 30 are one or more closed windings 31 each comprising a number of turns all of which lie in parallel planes. In operative relation to armature 30 is a field structure 32 provided with two opposed poles upon which is a field winding 33. Connected to field winding 33 is an indicating circuit comprising lead wires 34 which in turn are connected to a suitable source of alternating current 35. In indicating circuit 34 is a suitable resistance 36 and suitable electrical measuring instruments, an indicating ammeter 37, a curve drawing ammeter 38, and an integrating watt hour meter 39 being shown in the present instance.

Connected to lever 20 directly over fulcrum 21 is a cross-arm 40 to the ends of which are connected depending rods 41 which carry vertically-adjustable centering weights 42. These weights serve to center lever 20, holding it horizontal at times of zero flow. Mounted adjacent the end of lever 20 is a counter balancing weight 43 which serves to balance rod 19 and the parts connected to it. On weight 43 is a plate 44 provided with a cam surface 45 which engages a pin 46 projecting laterally from the upper end of an arm 47. Arm 47 is carried by the central portion of a cross-piece 48 which is provided on its underside with a knife edge 49 engaging a bearing on the top of a standard 50. Attached to the ends of cross-piece 48 are depending rods 51 which carry vertically-adjustable opposing counterbalancing weights 52.

The operation is as follows: Under no flow conditions the parts stand in the positions shown in the drawing, lever 20 being horizontal and closed windings 31 on armature 30 standing parallel to and in the plane of the magnetic field set up by field winding 33. In this position of the windings 29 the magnetic field sets up no currents in them. As a result the only current flowing in the field winding and in the indicating circuit is the exciting current. The total impedance of the indicating circuit and field winding is made of such value that this exciting current is small. The indicating instruments 37 and 38 are calibrated to read zero and the watthour meter 39 is compensated so that it does not move when only the exciting current is flowing.

Now, when flow of fluid takes place in the conduit through which the fluid to be metered flows, the pressure difference creating device sets up a pressure difference which bears a definite relation to the rate of flow and this pressure difference being applied to bell 10 causes its left-hand end to rise effecting thereby a turning movement of lever 20 on its fulcrum in a direction to lower the right-hand end of the lever. The movement of lever 20 is opposed by weights 52 which are swung on knife edge 49 through the intermediary of cam surface 45, and these weights will bring the lever to rest in a new position wherein weights 52 balance the differential pressure applied to bell 10. The lowering of the right-hand end of lever 20 turns armature 30 in an anticlockwise direction as viewed in the drawing, and brings closed windings 31 to a position wherein they stand at an angle to the plane of the magnetic field. As a result a flow of electric current will be set up in armature winding 31 and this current reacts on the field winding thereby decreasing the impedance of the indicating circuit and thus permitting a greater current to flow in such circuit. I have found by tests that the current flowing in the indicating circuit has a minimum value when the windings 31 are parallel to the magnetic field and that this current increases gradually as the armature is turned and reaches a maximum value when windings 31 stand at a right angle to the plane of the magnetic field. There is thus a gradual increase of current over a range of movement of 90 degrees of the armature. Also I have found that the relation of the movement of the armature to the change in current is approximately a straight line relation being modified only slightly by the external resistance of the indicating circuit, by the slots in the armature, and by the conditions of the magnetic circuit. In any event, however, the relation can be determined by tests and the indicating instruments suitably calibrated.

As is well known, the pressure difference creating device of a flow meter creates a pressure difference which is proportional to the square of the flow and hence this pressure difference when applied to a pressure responsive device such as the bell 10 tends to effect a movement of it proportional to the square of the flow. However, if a flow of electric current is to be integrated in terms of fluid flow then it must vary directly with the fluid flow. This result is produced in the present instance by means of the cam surface 45 through which the opposing weight 52 is moved. This cam is so shaped that a pressure difference proportional to the square of the fluid flow when applied to bell 10 will effect a movement of the end of lever 20 such that armature 30 will be moved to effect a flow of current in the indicating circuit which is directly proportional to the flow of fluid being metered. As a result, the current can be integrated directly in terms of fluid flow.

Of course, my invention may be used in connection with apparatus other than flow meters and when so used the structure may be modified to meet the particular conditions, the cam 45 being omitted if not needed. Also, it will be understood that means other than cam 45 may be used for modifying the movement of lever 20 or similar element.

By my invention I provide an instrument of the character described which is simple in structure, reliable in operation, comprises few moving parts, and in connection with which known types of electrical measuring instruments may be used.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:—

1. In a measuring apparatus of the character described, the combination of a lever, means connected with said lever to actuate the same, said means being responsive to an operating condition of a quantity to be measured for setting up a force tending to turn the lever which force bears a definite relation to the quantity to be measured, measuring means comprising an electrical circuit, a movable element associated therewith, for varying the current flowing in the circuit, and a current-responsive measuring instrument in said circuit, said movable element being connected with said lever and being movable thereby, and means for correlating the turning force applied to the lever and the current flowing in said circuit, said last-named means comprising a pivoted weight, an arm connected to the weight, a pin, and a member having a cam surface for engagement with the pin, said pin and member being carried one by the arm and the other by the lever and being adapted to move the weight on its pivot.

2. In a measuring apparatus of the character described, the combination of a lever, means connected with said lever to actuate the same, said means being responsive to an operating condition of a quantity to be measured for setting up a force tending to turn the lever which force bears a definite relation to the quantity to be measured, measuring means comprising an electrical circuit, a movable element associated therewith, for varying the current flowing in the circuit, and a current responsive measuring instrument in said circuit, said movable element being connected with said lever and being movable thereby, and means for correlating the turning force applied to the lever and the current flowing in said circuit, said last-named means comprising a suspended weight, a pivot from which the weight is suspended, an arm connected with the weight, a pin carried by the arm, and a member carried by the lever having a cam surface which engages the pin to move the weight on its pivot.

In witness whereof, I have hereunto set my hand this 4th day of October, 1924.

LOUIS W. THOMPSON.